United States Patent [19]

Featherstone

[11] Patent Number: 5,107,672

[45] Date of Patent: Apr. 28, 1992

[54] RIGID DRIVE ASSEMBLY

[75] Inventor: Harry E. Featherstone, Wooster, Ohio

[73] Assignee: The Will-Burt Company, Orrville, Ohio

[21] Appl. No.: 698,288

[22] Filed: May 10, 1991

Related U.S. Application Data

[62] Division of Ser. No. 579,944, Sep. 10, 1990, abandoned.

[51] Int. Cl.$^5$ .............................................. F16G 13/22
[52] U.S. Cl. ........................................... 59/84; 59/4; 59/5; 59/78; 474/206
[58] Field of Search ............... 59/4, 5, 6, 78, 78.1, 59/82, 84; 474/206, 210

[56] References Cited

U.S. PATENT DOCUMENTS

| | | | |
|---|---|---|---|
| 1,209,765 | 12/1916 | Schenk | 474/210 |
| 1,725,467 | 8/1929 | Marble | 474/210 |
| 2,038,149 | 4/1936 | Walters | |
| 3,086,210 | 4/1963 | Good et al. | |
| 3,181,730 | 5/1965 | Schafruth | |
| 3,949,619 | 4/1976 | Kuehl | |
| 4,878,345 | 11/1989 | Bechtold | 59/5 |

FOREIGN PATENT DOCUMENTS

| | | | |
|---|---|---|---|
| 999751 | 2/1952 | France | 474/210 |
| 68420 | 4/1958 | France | 474/210 |
| 30343 | 3/1979 | Japan | 59/5 |
| 0156540 | 12/1981 | Japan | 59/4 |
| 504901 | 1/1976 | U.S.S.R. | 59/78 |
| 15344 | 7/1902 | United Kingdom | 474/206 |

OTHER PUBLICATIONS

"Diamond Stock, Power Transmission Products", Aug. 1967, pp. 60-6, 60-8, 60-10, and 60-24.

Primary Examiner—David Jones
Attorney, Agent, or Firm—Body, Vickers & Daniels

[57] ABSTRACT

A rigid drive assembly is constructed of two interconnected, flexible chain elements.

17 Claims, 14 Drawing Sheets

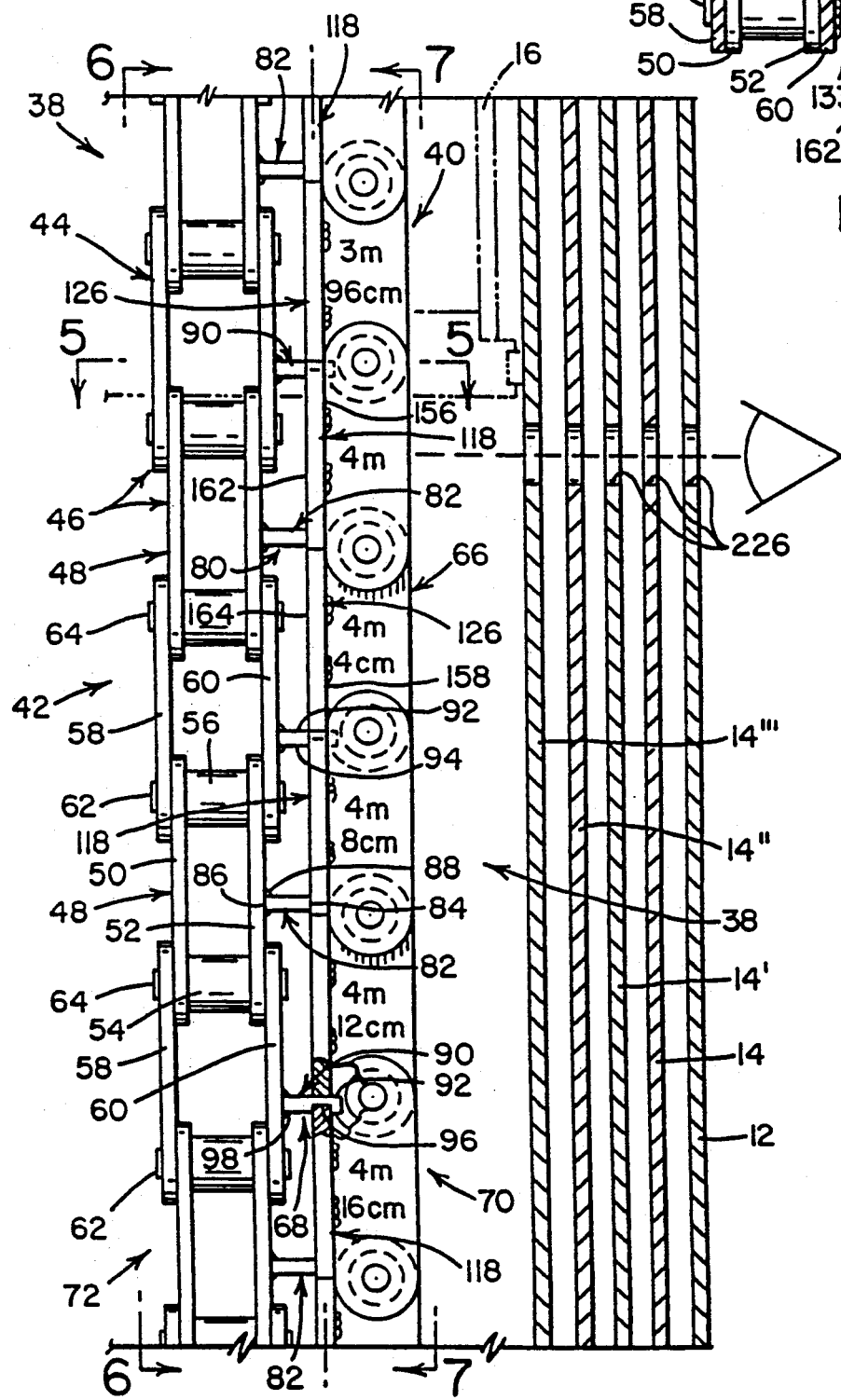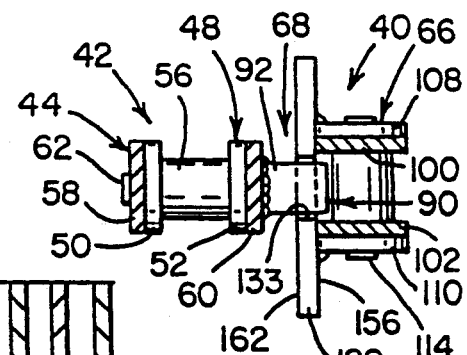

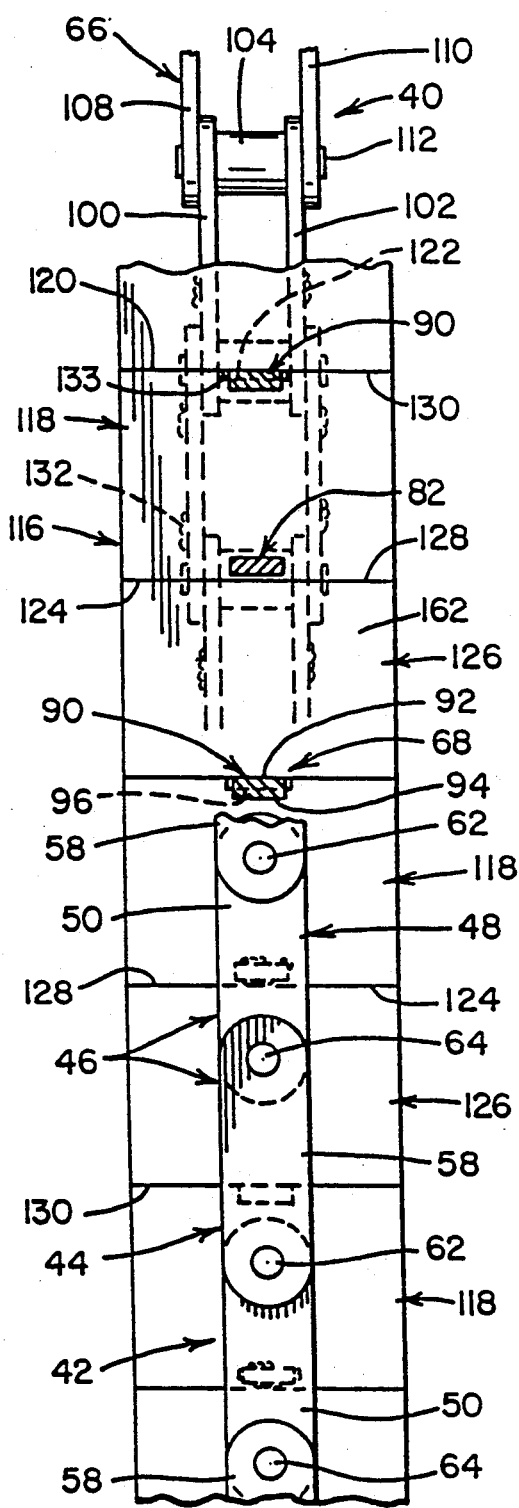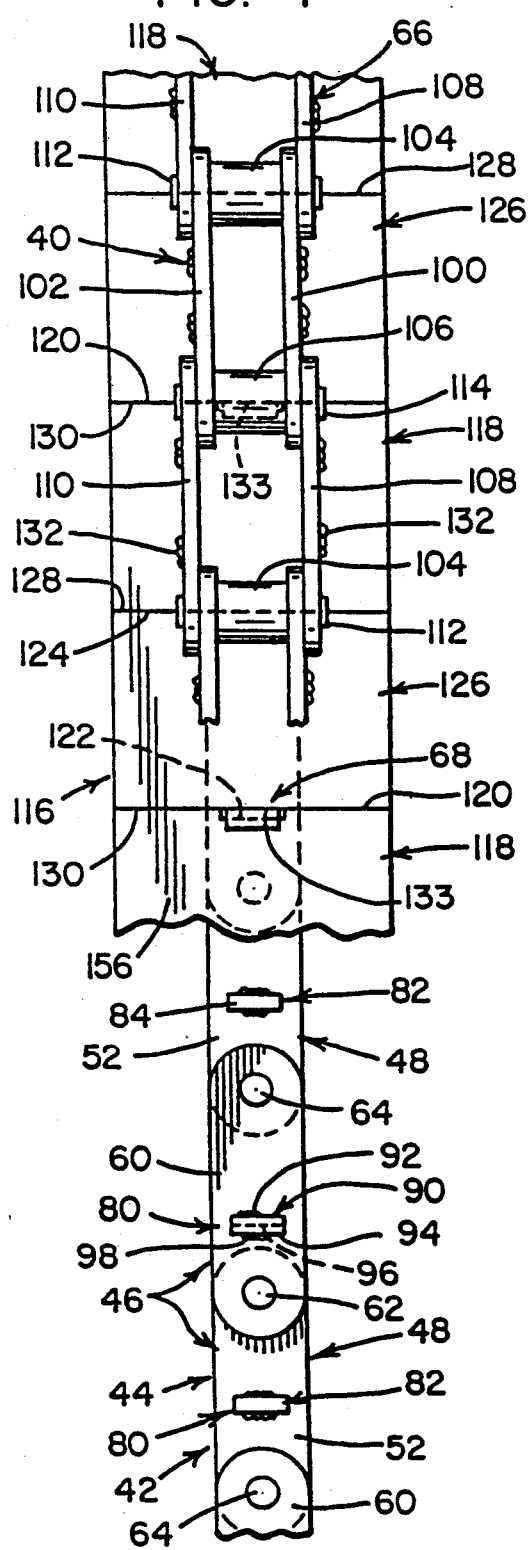

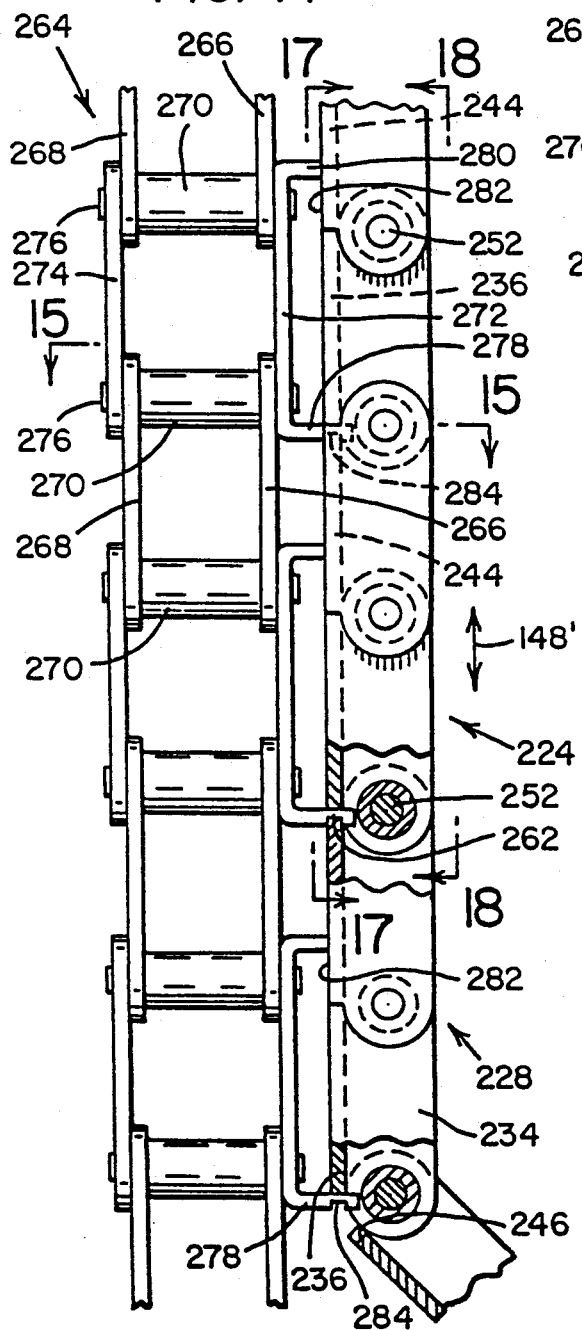
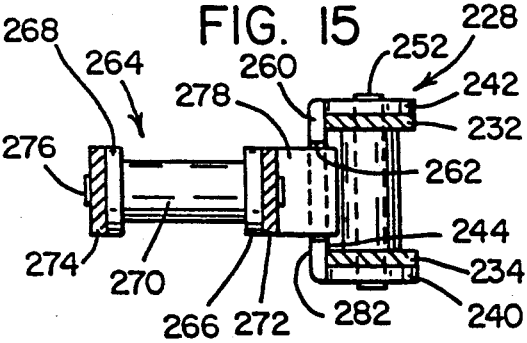
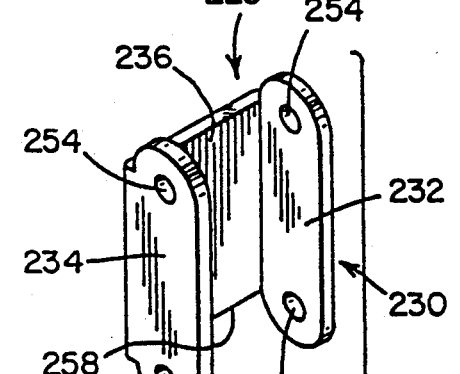

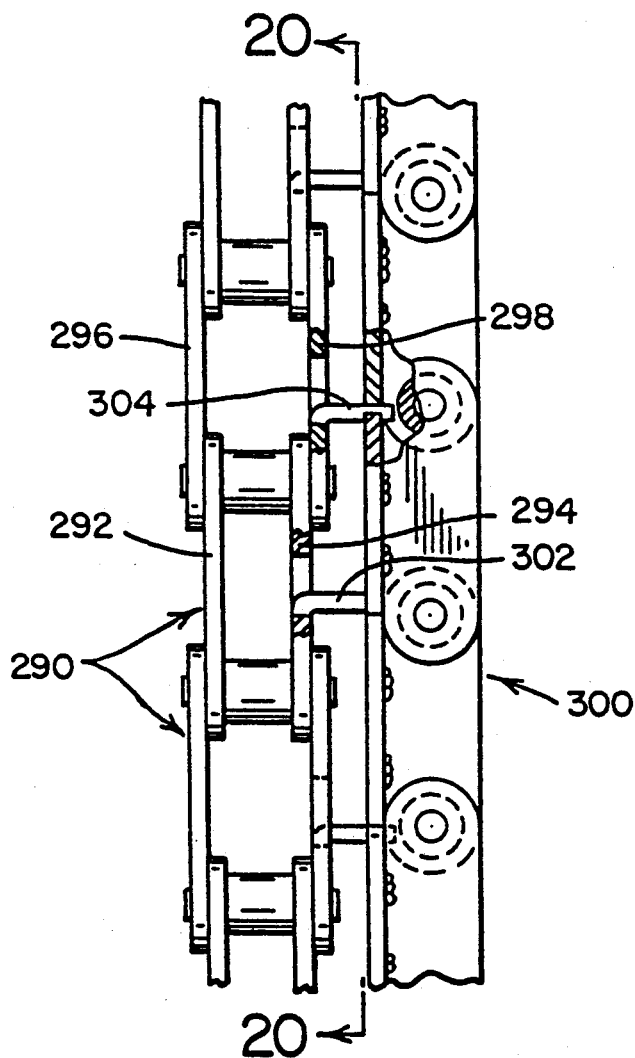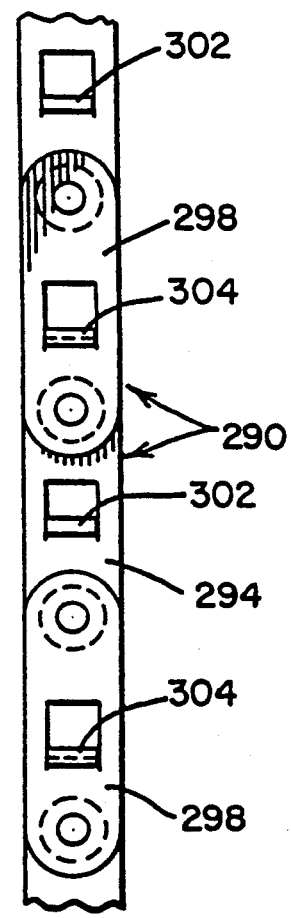
FIG. 19
FIG. 20

RIGID DRIVE ASSEMBLY

This application is a division of application Ser. No. 579,944, filed on Sep. 10, 1990 abandoned The present invention relates to the art of telescoping masts and more particularly to a telescoping mast having a rigid drive assembly for telescoping mast sections to any position between fully retracted and fully extended heights.

The present invention is particularly applicable for use in quick erecting telescoping masts and will be particularly described with particular reference thereto; however, the invention has much broader applications and may be used in various other applications for moving relatively heavy loads in a generally straight line.

BACKGROUND OF THE INVENTION

Quick erecting telescoping masts are used for many applications including civilian, industrial and military applications throughout the world. Quick erecting telescoping masts are particularly suited for applications wherever there is a need for portable masts requiring fast setup and teardowns with minimum power and effort. In addition to numerous military applications, including target acquisitions, surveillance and field communications, quick erecting telescoping masts are utilized commercially to support a wide variety of antennas, elevated testing equipment, floodlights and cameras. Free-standing masts can be installed on a wide variety of vehicles and shelters.

In the past, the telescoping masts were typically pneumatically operated. This entailed airtight seals between the adjacent mast sections so that the air which was delivered into the bottom of the mast would not bleed out of the system and cause the mast to retract.

Another problem which could affect the usefulness of the pneumatically operated masts was their being damaged during operation. For instance, if a hole was formed in a section of a mast by a projectile, the air could bleed out and the mast could collapse. Moreover, sometimes the projectile could form a hole with a ragged edge which prevented the telescoping mast from retracting.

A related problem associated with pneumatically operated masts related to ice formed between the mast sections and preventing the telescoping mast from being extended or retracted.

A further deficiency of the pneumatically operated telescoping masts was that they primarily had two positions. Either they were fully retracted or fully extended. However, to partially extend the telescoping mast was typically beyond the capabilities of the portable, pneumatically operating mast equipment. Since an antenna which incorporates the mast itself can have its frequency affected by the height of the mast, the ability to partially extend the mast to a desired height is an important feature which was not easily accomplished in the prior art. Further, even when a pneumatically operated telescoping mast was partially extended, the precise position of the upper end was not known. Thus, it was difficult to ascertain the exact frequency of the mast and antenna assembly when the antenna was in fully extended position.

INVENTION

The present invention is specifically directed to a telescoping mast assembly incorporating a plurality of interconnected mast sections nesting within each other and adopted for movement between a fully retracted height and a fully extended height. A rigid drive assembly telescopes the mast sections to any position between the fully retracted and the fully extended height. The rigid drive assembly is constructed of at least two flexible drive elements which accurately position the interconnected mast sections.

It is believed that the prior art does disclose a plurality of separate strips of material being fed together and wrapped with a separate wire to form a rigid structure. However, this can be distinguished from the present invention where the flexible chains have the latching mechanism, for interconnecting the chains and forming the rigid drive, as an integral part of the chain elements.

In accordance with the invention, one of the flexible drive elements is a driven chain constructed of a plurality of interconnected driven chain links. The driven chain has a first driven section extending in the longitudinal direction and connected to the interconnected mast sections. The driven chain is connected to a second flexible drive element which comprises a drive chain with a first drive section extending in the longitudinal direction of and connected to the interconnected mast sections.

Another important aspect of the present invention relates to a latching mechanism interconnecting the first drive section and the first driven section to construct the rigid drive assembly. It will be appreciated that the first driving section and the first driven section are disposed adjacent to each other and latched together to form the rigid drive assembly which operates the interconnected mast sections.

Turning to the specifics of the latch assembly, the drive chain is constructed of a plurality of interconnected drive chain links wherein adjacent drive chain links are interconnected by a drive link pin. The drive chain links have latch elements which are connected to the driven chain links. The driven chain is also constructed of a plurality of interconnected driven chain links wherein the adjacent driven chain links are interconnected by a driven link pin. The driven links have latch elements affixed thereto for connecting the driven links to the drive links so that the first driven section is driven by the movement of the first drive section.

Turning to the details of the drive links, each has a plate element affixed thereto and disposed with respect to each other in the first drive section to abut one another and rigidly affix adjacent drive links to each other. One type of plate element is constructed of a substantially rectangular plate having a substantially flat upper edge surface with a plate slot formed therein and an opposing substantially flat lower edge surface. A second type of plate element is constructed of a substantially rectangular plate having substantially flat upper and lower edge surfaces. The first and second types of plate elements are alternately disposed between each other in the first drive section whereby the flat upper edge surface of the second plate element abuts the substantially flat lower edge surface of the first plate element and the substantially flat upper edge surface of the first plate element abuts the substantially flat lower edge surface of the second plate element with the plate slot therebetween.

Turning now to the specifics of the driven links, each has a projecting element attached thereto for interconnecting the driven links to the drive links in the first drive section. There are two types of projecting elements. A first type of projecting element is constructed of a rod having a substantially flat first end with a rectangular cross section. Each of the first type of projecting elements is affixed at a second end, oppositely disposed from said first end, to extend outwardly from the longitudinally disposed first driven section. The second type of projecting element is constructed of a rod having a substantially rectangular cross section with a substantially flat upper surface and a substantially flat lower surface. The flat lower surface has a projecting element slot formed therein. The first and second projecting elements are affixed to alternate, adjacent driven links whereby the substantially flat ends of the first projecting elements abut against a first plate surface of the first plate elements to maintain a distance between the drive and driven sections. The second projecting element is received within the plate slot so that the projecting element slot interconnects with the plate slot formed in the upper edge of the first plate. The projecting elements can be flexibly mounted to the driven links to prevent jam-ups due to misalignment of the projecting elements and the plate elements.

Another aspect of the present invention relates to the space saving advantages. Specifically, a second drive section of the drive chain is connected at a first end to the first drive section and extends transversely to the second drive section. A drive chain spool is connected to a second end of the second drive section for winding the drive chain thereon. As with the drive chain, the driven chain also includes a second driven section connected at a first end to the first driven section and extending transversely to the first driven section. Further, a driven chain spool is connected to a second end of the second driven section for winding the driven chain thereon. It can be appreciated, that the use of a drive chain spool and a driven chain spool can significantly reduce the space required to support the drive assembly associated with the telescoping mast assembly of the present invention.

In order to operate the drive chain, a drive sprocket is disposed at the intersection of the first and second drive sections for engaging the drive links to extend and retract the drive section. The drive sprocket is operated by conventional means such as a motor and gear reduction unit.

Further, in accordance with the invention, the drive sprocket is preferably constructed with a substantially cylindrical peripheral surface including a plurality of sprocket grooves having substantially equal spacing about the peripheral surface for engaging the chain drive rollers. The cylindrical peripheral surface also functions to press the plate elements into abutment with each other to rigidly affix adjacent drive links. The cylindrical peripheral surface also presses the plate elements towards the drive chain. The effect of the drive sprocket operation is a tendency to move the drive chain towards the driven chain and possibly diminish the rigidity of the chain.

Therefore, the present invention further includes a biasing device for pressing the plate elements towards the drive sprocket whereby a rigid interconnection between the drive plates in the first drive sections is maintained. The biasing device includes first and second cylindrical rollers spaced apart to receive the first driven section of the interconnected driven links. The cylindrical rollers are connected by a shaft. Springs are attached to the shaft to bias the cylindrical rollers towards the drive sprocket. The biasing device also presses the driven chain towards the drive chain to maintain the interconnection between the two chains.

Also in accordance with the invention, the position of the mast can be determined by viewing indicia provided on either the drive or driven chain to indicate the precise extended position of the mast.

Another aspect of the present invention relates to the connection between the first driven section, the first drive section and the innermost, movable mast section. This connection can include a ball joint in cooperative relationship with the innermost movable mast to accommodate any misalignment between the rigid drive assembly and the telescoping mast.

Still another aspect of the present invention is that wiring can be provided internal to the mast assembly.

A yet further aspect of the present invention is that the chain can be manufactured from ferrous, non-ferrous, metallic and non-metallic materials.

The primary object of the present invention is to provide a telescoping mast assembly including a plurality of interconnected mast sections nested within each other for movement between a fully retracted height and a fully extended height. The telescoping mast assembly explained hereinbefore includes a novel rigid drive assembly for telescoping the mast sections to any position between a fully retracted and fully extended heights. A further object is the provision of this novel drive assembly.

Another object of the present invention is to provide a telescoping mast assembly where the rigid drive assembly is constructed of two flexible drive elements which can be easily stored in a relatively small space.

A further object of the present invention is to provide a telescoping mast assembly which provides accurate positioning of the mast.

A still further object of the present invention is to provide a telescoping mast assembly which is relatively rugged while being relatively easy to maintain.

Yet another object of the present invention is to provide a telescoping mast assembly which obviates the problems and limitations of the prior art devices.

These and other objects and advantages will become apparent from the following description taken together with the accompanying drawings.

BRIEF DESCRIPTION OF THE DRAWINGS

FIG. 4 is a side view of the first drive section latched to the first driven section.

FIG. 5 is a view through section 5—5 of FIG. 4;

FIG. 6 is a view through section 6—6 of FIG. 4;

FIG. 7 is a view through section 7—7 of FIG. 4;

FIG. 14 is a view of a second embodiment of both the first drive section and first driven section in the interconnected latched condition;

FIG. 15 is a view through section 15—15 of FIG. 14;

FIG. 16 is an assembly view of inner and outer adjacent drive links of the drive chain;

FIG. 19 is a view of a third embodiment of the first drive section and the first driven section being connected by a latching structure; and, FIG. 20 is a view through 20—20 of FIG. 19.

PREFERRED EMBODIMENT

Figure 1:
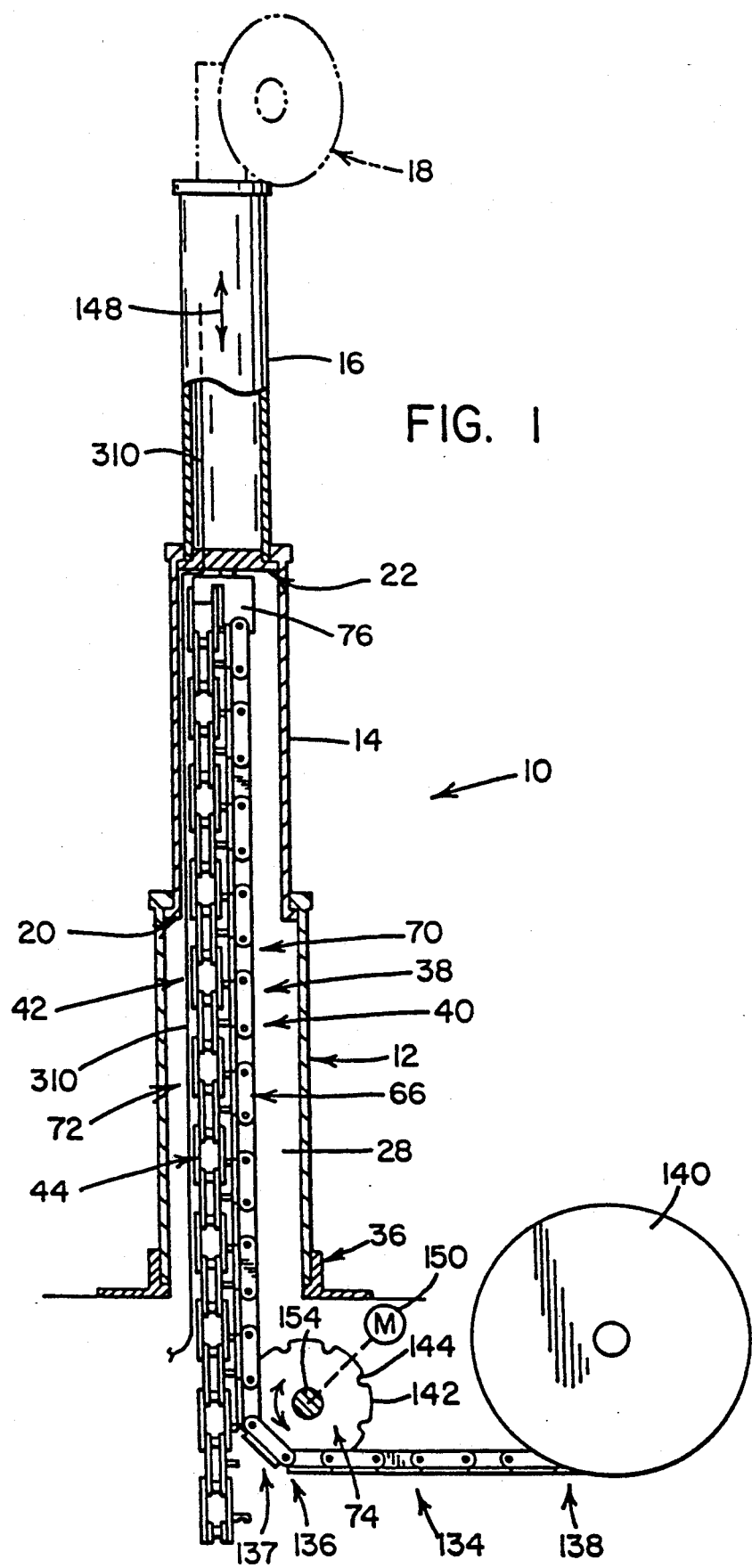
FIG. 1 is a front view showing a telescoping mast assembly incorporating a rigid drive assembly for telescoping the mast sections to any position between the fully retracted and the fully extended heights.
Figure 2:
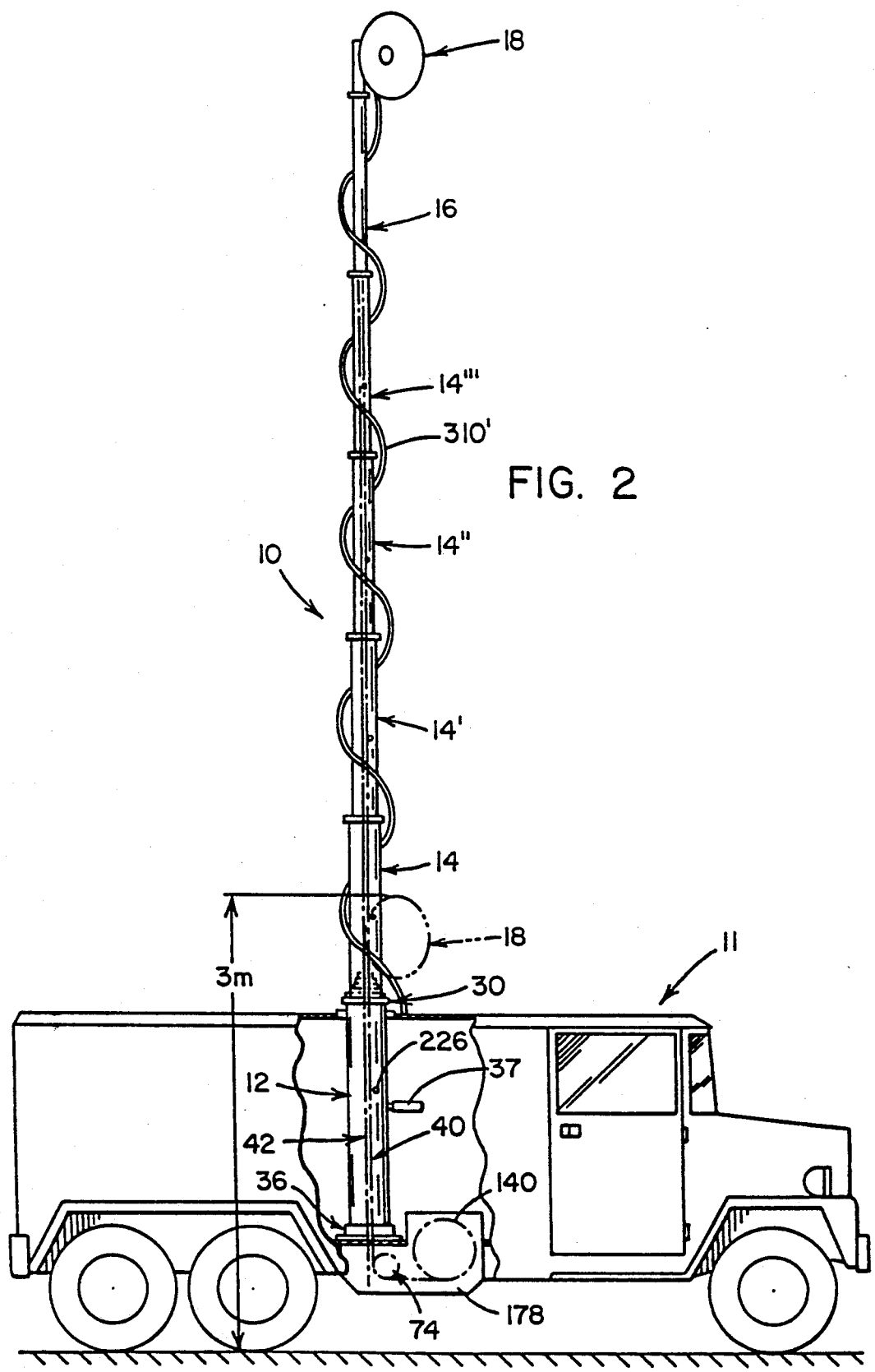
FIG. 2 is a side view of a telescoping mast assembly incorporated into a truck for supporting equipment in accordance with the preferred embodiment of the present invention.

Referring now to the drawings wherein the showings are for the purpose of illustrating preferred embodiments of the invention only, and not for the purpose of limiting same, FIG. 1 shows a telescoping mast assembly 10 for use with a vehicle, such as truck 11, as shown in FIG. 2. The telescoping mast assembly 10 includes a plurality of interconnected mast sections 12-16 as generally shown in FIG. 1. Although six interconnected mast sections are illustrated, it is within the terms of the present invention to incorporate any number as desired. Typically, the mast extends in a range from about 20 feet to about 150 feet. However, it is within the terms of the invention to lengthen or shorten the range as required. As illustrated in FIG. 1, the outermost mast section 12 is stationary and is immovably affixed to a movable support structure such as vehicle 11. The innermost mast section 16 is attached to any desired operating equipment 18, such as an antenna, which is supported by the mast assembly 10.

Figure 11:
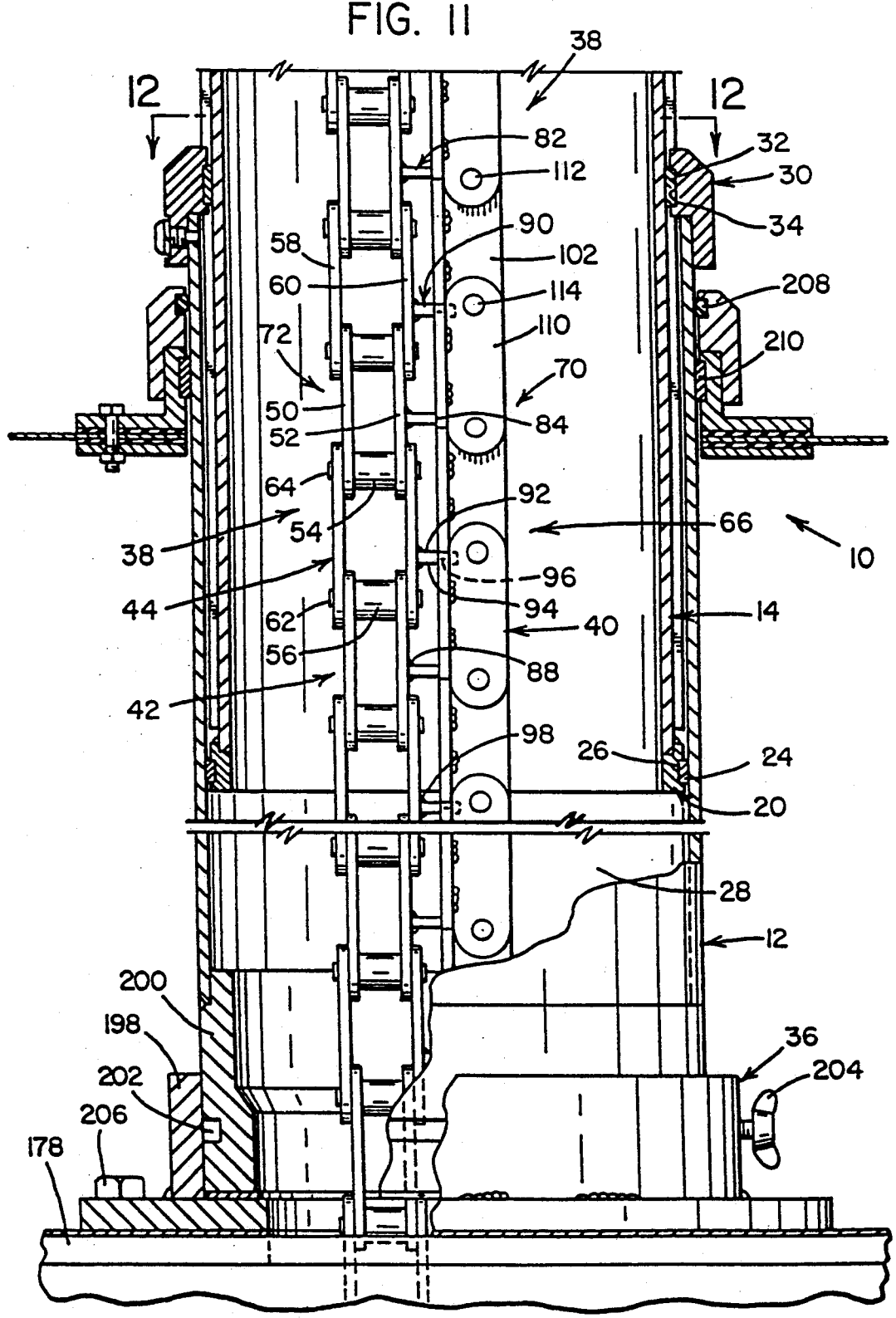
FIG. 11 is a side view illustrating the rigid drive assembly extending longitudinally upwards through telescoping mast sections.

As further illustrated in FIG. 1, each of the interconnected mast sections 14 through 16 are cylindrical tubes having outwardly extending cylindrical flanges 20 and 22 which have a slightly smaller diameter than the internal diameter of the tubes 12 and 14, respectively in a longitudinal direction. This enables the tubes to telescope in and out of adjacent tubes. The cylindrical flanges are important because they also provide a bearing surface between the cylindrical tubes. Referring to FIG. 11, a seal 24 can be provided in a groove 26 formed in the cylindrical flange 20 to seal the interior cavity 28 of the tube 12. In addition, each of the tubes includes an inwardly extending cylindrical flange 30 having a seal 32 disposed in a groove 34. The conventional seal 32 generally acts against the external cylindrical surface of the adjacent nested mast sections 14, 14', 14'', 14''' and 16 to prevent undesirable elements, such as condensation, from collecting between adjacent tubes. Structural elements indicated by primed, double primed and triple primed reference numerals, throughout the instant specification, are substantially identical to the element designated by the unprimed reference numeral. It is, however, within the terms of the present invention to provide any type of seal structure or delete the seal structure if desired.

Typically, the individual mast sections are manufactured from high strength, heat treated annodized aluminum alloy tubes and collars. It is also within the terms of the present invention to form the tubes of other materials such as carbon fiber sheets which are advantageous because of their light weight relative to their high strength. Moreover, these materials can easily be shaped into cross-sections, other than circular, as desired.

The bottom most mast section 12 is typically received within a flange 36 which can rotatably receive the mast 12 in any conventional manner. If desired, a handle 37, as illustrated in FIG. 2, can be attached to the mast 12 in order to rotate the telescoping mast assembly 10 to any desired position.

The present invention is particularly directed to a rigid drive assembly 38 for telescoping the mast sections 14 and 16 to any position between a fully retracted height, not illustrated, and a fully extended height as shown in FIG. 2. The rigid drive assembly 38 is constructed of at least two flexible drive components or elements 40 and 42 to accurately position the interconnected mast sections 10. Flexible drive element 42 includes a driven chain 44 constructed of a plurality of interconnected driven chain links 46. The chain links 46, as illustrated in FIG. 4, are preferably constructed of a roller chain assembly. An inside driven chain link 48 consists of two inside driven plates 50 and 52 and two driven rollers 54 and 56 carried by bushings, not illustrated, disposed between the inside or inner plates 50 and 52. Adjacent inside chain links 48 are connected to each other with outside or outer driven pinlink plates 58 and 60 assembled with pins 62 and 64. The pins 62 and 64 are received within the bushings supporting rollers 54 and 56. The ends of the pins 62 and 64 can be attached to the outer plates 58 and 60 in any desired manner.

Figure 3:
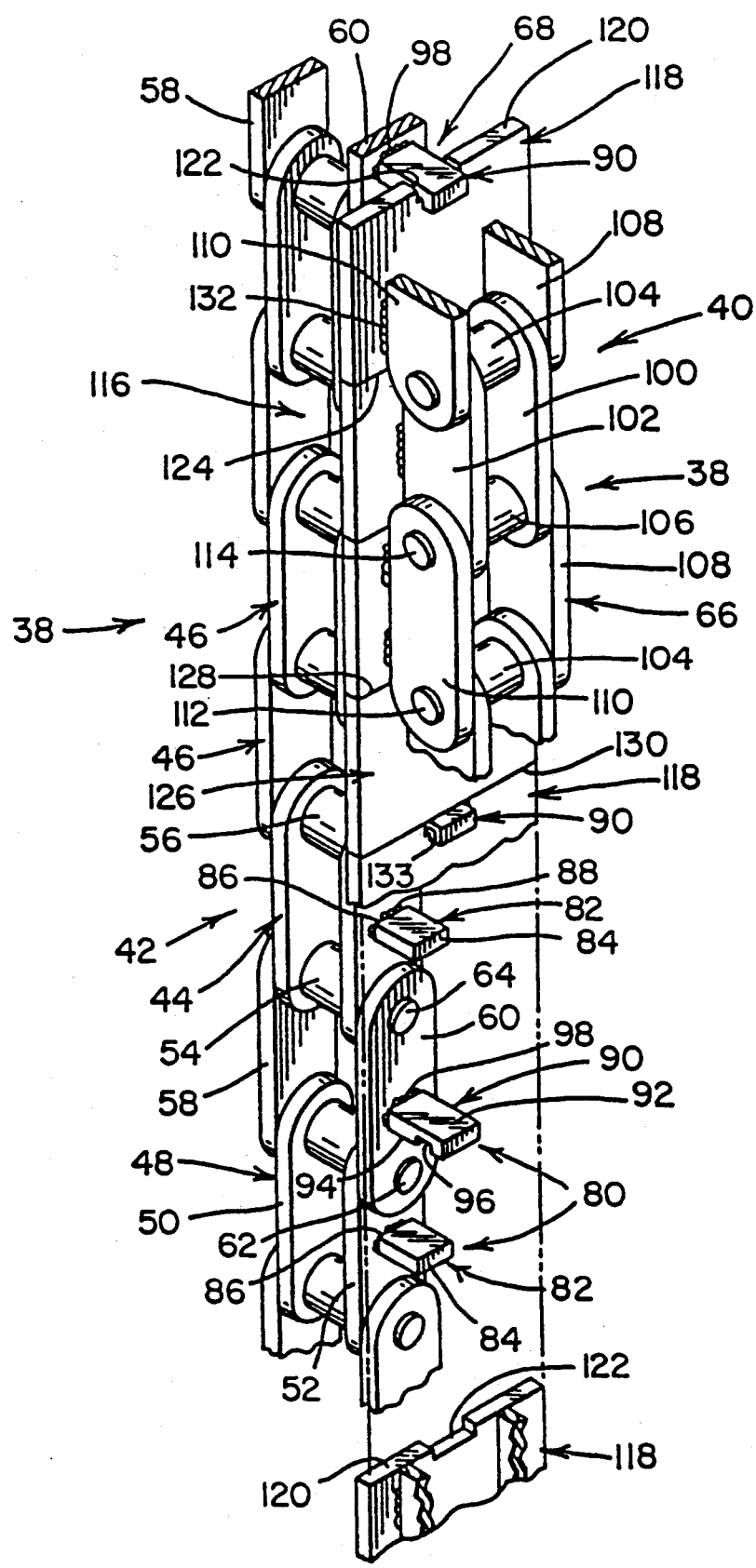
FIG. 3 Is a perspective view of the first drive section and the first driven section in their rigid, latched condition.

As seen in FIGS. 3 through 5, the driven chain 44 of driven element 42 is disposed adjacent to the drive chain 66 of the drive element 40. The spaced relationship between the drive element 40 and the driven element 42 enables the latching mechanism 68 to interconnect driven chain 44 to drive chain 66. The interconnection occurs between the first drive section 70 and the first driven section 72 to construct the rigid drive assembly 38. The first drive section 70 and the first driven section 72 are disposed adjacent each other, as seen in FIG. 1. The first drive section 70 extends from a drive sprocket 74 to a connector link 76. Similarly, the first driven section 72 extends from a chain translation element 77 to the connector link 76.

Referring again to the construction details of latching mechanism 68, each of the driven chain links 46 has projecting element means 80 attached thereto for interconnecting the driven chain links 46 to the drive chain links 66 in the first drive section 70. The projecting element means 80 comprises a plurality of first projecting elements 82 preferably constructed of a rod having a substantially flat, first end 84 with a substantially rectangular cross-section. The first projecting elements 82 are affixed at a second end 86 to inside plates 52 of the chain link 46. The first projecting elements 82 extend transversely outwardly from the longitudinally disposed first driven section 72. The connection of the first projecting element 82 to the inside plate 52 can be done by any means such as a welded joint 88. It is however within the scope of the present invention to affix the projecting element 82 by any other desired means such as forming it as an integral component of the inside plate 52.

The projecting element means 80 also comprises a plurality of second projecting elements 90 which are constructed of a rod having a substantially rectangular cross section with a substantially flat upper surface 92 and a substantially flat lower surface 94. The flat lower surface 94 has a projecting element slot 96 formed therein. The second projecting elements 90 are affixed to an outside plate 60 by any means such as weld joint 98.

Although both of the projecting elements 82 and 90 are securely affixed to the chain links 46, it is preferably that they are sized, i.e. have a narrow width, to be flexible with respect to the chain links in order that they can move to accommodate slight misalignment between the driven chain 44 and the drive chain 66. Further, although the first projecting elements 82 are illustrated as being attached to the inside plates 52 and the second projecting elements 90 are illustrated as being attached to the outside plates 60, it is within the terms of the present invention to reverse the connections so that the first projecting elements 82 are affixed to the outside plates 60 and the second projecting elements 90 are attached to the inside plates 52. The details of the latching mechanism between the projecting element means 80 and the drive chain 66 will be described hereinafter.

Turning our attention to the drive chain 66, it is constructed of essentially the same elements as the driven chain 44. That is, there are inside plates 100 and 102 and rollers 104 and 106 which are disposed on bushings (not shown) between the inside plates 100 and 102. Outside plates 108 and 110 are provided to connect adjacent links with pins 112 and 114 which extend through the rollers 104 and 106 to connect adjacent drive links together.

The drive chain 66 includes latching structure 68 comprising plate element means 116. The plate element means includes a plurality of first plate elements 118 constructed of substantially rectangular plates each having a substantially flat upper edge surface 120 with a plate slot 122 formed therein and an opposing substantially flat lower edge surface 124. A plurality of second plate elements 126 are also constructed of substantially rectangular plates each having substantially flat upper and lower edge surfaces 128 and 130, respectively.

The first plate elements 118 are affixed to the outside plates 108 and 110 by any desired means such as joint welds 132. The first and second plate elements 118 and 126, respectively, are alternately disposed between each other along the entire length of the drive chain 66. However, in the first drive section 70, the plate elements are disposed so that the flat upper edge surface 128 of the second plate element 126 abuts against the substantially flat lower edge surface 124 of the first plate element 118 and the substantially flat upper edge surface 120 of the first plate element having plate slot 122 abuts against the substantially flat lower edge surface 130 of the second plate element 126 to provide an aperture 133 therebetween. The abutment of the plate elements 118 and 126 within the first drive section 70 causes the otherwise flexible drive chain 66 to form a rigid chain throughout the length that the first and second plate elements abut one another.

To more fully understand the latching structure 68, an explanation of the interrelationship between the projection element means 80 and the plate element means 116 follows. The latching mechanism 68 interconnects the first drive section 70 and the first driven section 72 to construct the rigid drive mechanism 38. Note that the first drive section is disposed adjacent to the first driven section, as illustrated in FIG. 4. However, the drive chain 66 and the driven chain 44 are oriented at an approximate 90 degree angle with respect to each other. In other words, the pins 62 and 64 of the driven chain link 48 are disposed at substantially a 90 degree angle with respect to the pins 112 and 114 of the drive chain 66. As seen in FIG. 4, the first projecting elements 82 abut against first plate elements 118. Moreover, the second projecting elements 90 are received in the apertures 133 between the first and second plate elements 118 and 126 so that the projecting slot 96 engages the slot 122 and the upper surface abuts against the lower edge surface 130 of the second plate element 126. At the same time, the projecting elements 90 are essentially locked into aperture 133. The first projecting elements 82 abut against the plate elements 118 to maintain a constant distance between the drive chain and driven chain and to increase the rigidity of the drive mechanism 38.

Figure 8:
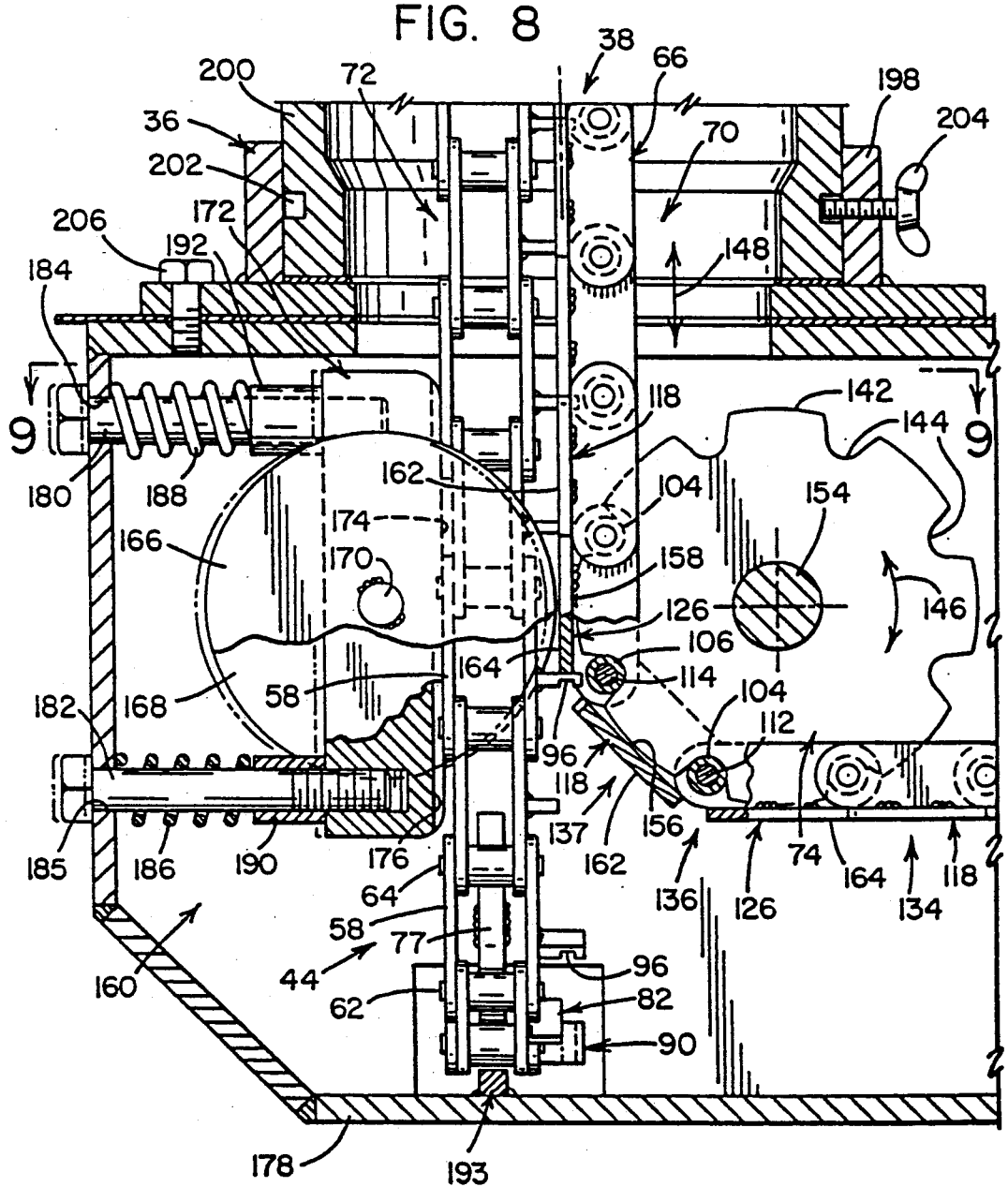
FIG. 8 is a side view showing the interconnection between the drive sprocket and the first and second drive sections and the operation of the biasing component for pressing both the driven chain and the driven chain towards the drive sprocket.

Referring to FIGS. 1 and 8, there is illustrated a second drive section 134 connected at a first end 136 by a transition drive section 137, to the first drive section 70. The second drive section 134 extends transversely to the first drive section and is connected at a second end 138 to a drive chain spool 140. The drive chain spool 140 can be of any conventional design. It can be appreciated, that the use of a drive spool enables a long length of chain to be compactly stored in a relatively small space which is particularly advantageous in portable applications such as in a vehicle 11 as shown in FIG. 2.

Figure 9:
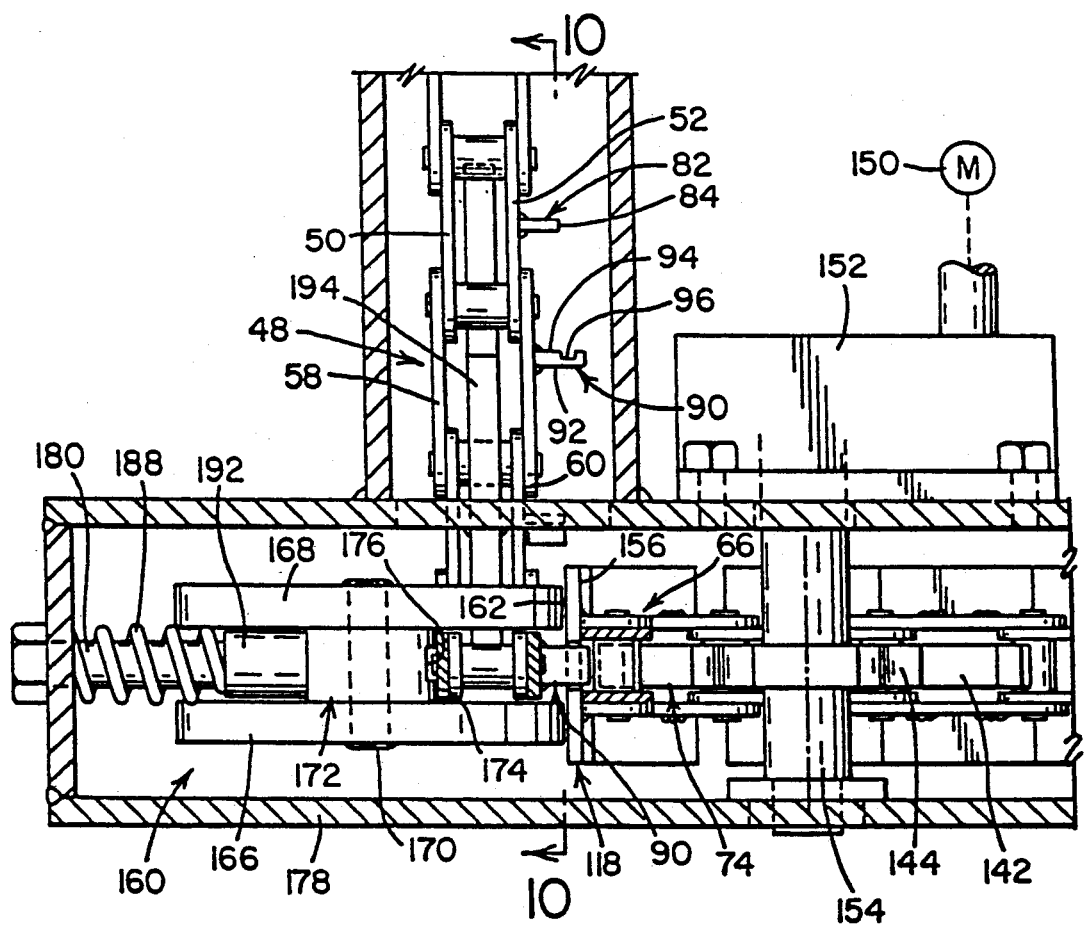
FIG. 9 is a view through section 9—9 of FIG. 8.

A drive sprocket 74, as shown in FIGS. 1, 8 and 9, is disposed at the intersection of first and second end transition drive sections 70 and 134 respectively, for engaging the drive chain 66 to extend and retract the first drive section 70 in the longitudinal direction so as to move the drive assembly as illustrated by arrow 148. For example, the longitudinal movement of the drive assembly will effect the telescoping of the mast sections to any desired position between the fully retracted and fully extended heights. The drive sprocket 74 has a substantially cylindrical peripheral surface 142 and includes a plurality of sprocket grooves 144 having substantially equal spacing about the peripheral surface 142 for engaging drive rollers 104 and 106 as the drive sprocket turns in the clockwise or counter-clockwise direction as illustrated by arrow 146. In FIG. 8, clockwise movement of sprocket 74 causes the chain to be moved upward in the longitudinal direction causing the mast sections to extend upwards. Conversely, turning the drive sprocket in the counter-clockwise direction causes the drive chain 66 to move downward and rolls the chain onto the spool 140. The rotation of the drive sprocket 74 can be controlled by a motor 150 which operates through a reducing gear mechanism 152 to rotate a shaft 154 and ultimately the drive sprocket 74. The rotation of the drive sprocket can be provided by any other conventional means and, if desired, can even be manually operated.

In the operation of the drive sprocket 74, its cylindrical peripheral surface 142 presses against the second plate surfaces, 156 and 158 of first and second plate elements 118 and 126, respectively, to which the drive chain 66 is attached. As shown in FIGS. 8 and 9, the peripheral surface 142 abuts against an adjacent, overlying plate element and presses it to rigidly affix it to an adjacent drive link. Concurrently, the cylindrical peripheral surface 142 also presses the second flat surfaces 156 and 158 toward the drive section 72 in a transverse direction to the longitudinal direction of the first drive section 70. This results in a tendency for bowing the drive chain 66 in the drive section 72 which reduces the rigidity of the rigid drive device 38. To ensure a high degree of rigidity, a bias means 160 is provided to press against the first plate surfaces 162 and 164 of the plate elements 118 and 126, respectively, and bias the plate elements towards the drive sprocket 74 to ensure a rigid interconnection between the drive plates in the first drive section.

Referring again to FIG. 8, as the sprocket 74 rotates to move the links from the second drive section 134 into the first drive section 70, there is also a tendency for the cylindrical peripheral surface 142 to move the driven chain 44 in the driven section 70 transverse to the longitudinal direction 148 which is to be maintained to ensure a rigid interconnection via latching mechanism 38. To counteract this tendency, the bias means 160 provides a counter bias force in the direction of the drive sprocket 74 to maintain a substantially parallel alignment of the drive chain 66 and the driven chain 44 throughout the first drive and driven sections 72 and 70.

The biasing means 160 can include first and second cylindrical rollers 166 and 168 spaced apart from each other to receive the first drive chain section 70 of interconnected driven links 48. The cylindrical rollers 166 and 168 are connected to each other by a shaft 170. A support block 172 is disposed between the cylindrical rollers and affixed thereto by the shaft 170. A first side 174 of the support block 172 is disposed in the longitudinal direction of the first driven section 72 and includes a groove 176 in the front surface to receive the protruding pins 62 and 64 of the driven chain links 48. The groove enables the outside plates 58 of the driven chain links 48 to abut directly against the front surface 174 of the support block 172. Thus, while the cylindrical rollers 166 and 168 are pressing the drive chain 66 so as to maintain a rigid relationship between abutting links, the support block 172 is pressing against the driven chain links 48 to maintain a rigidity in the driven chain 44 when the first driven section 72. The bias means 160 is connected to a housing structure 178 which encloses the operating structure for the telescoping mast 10. Preferably, bolts 180 and 182 are slidably mounted within apertures 184 and 185 in the housing structure 178. The bolts are threadedly received within the support block 172 and are provided with springs 186 and 188 which act against collars 190 and 192 to concurrently press the cylindrical rollers 166 and 168 against the drive chain 66 while pressing the support block 172 against the driven chain 44. It is within the terms of the present invention to change the biasing force on the drive chain and driven chain by the selection of the spring 186 and 188. Further, although a specific design is presented for concurrently biasing both the drive chain and the driven chain, it is within the terms of the present invention to provide some other device to maintain the drive and driven chain within the first drive and driven sections 70 and 72, respectively, in an axis extending in the longitudinal direction 148.

Figure 10:
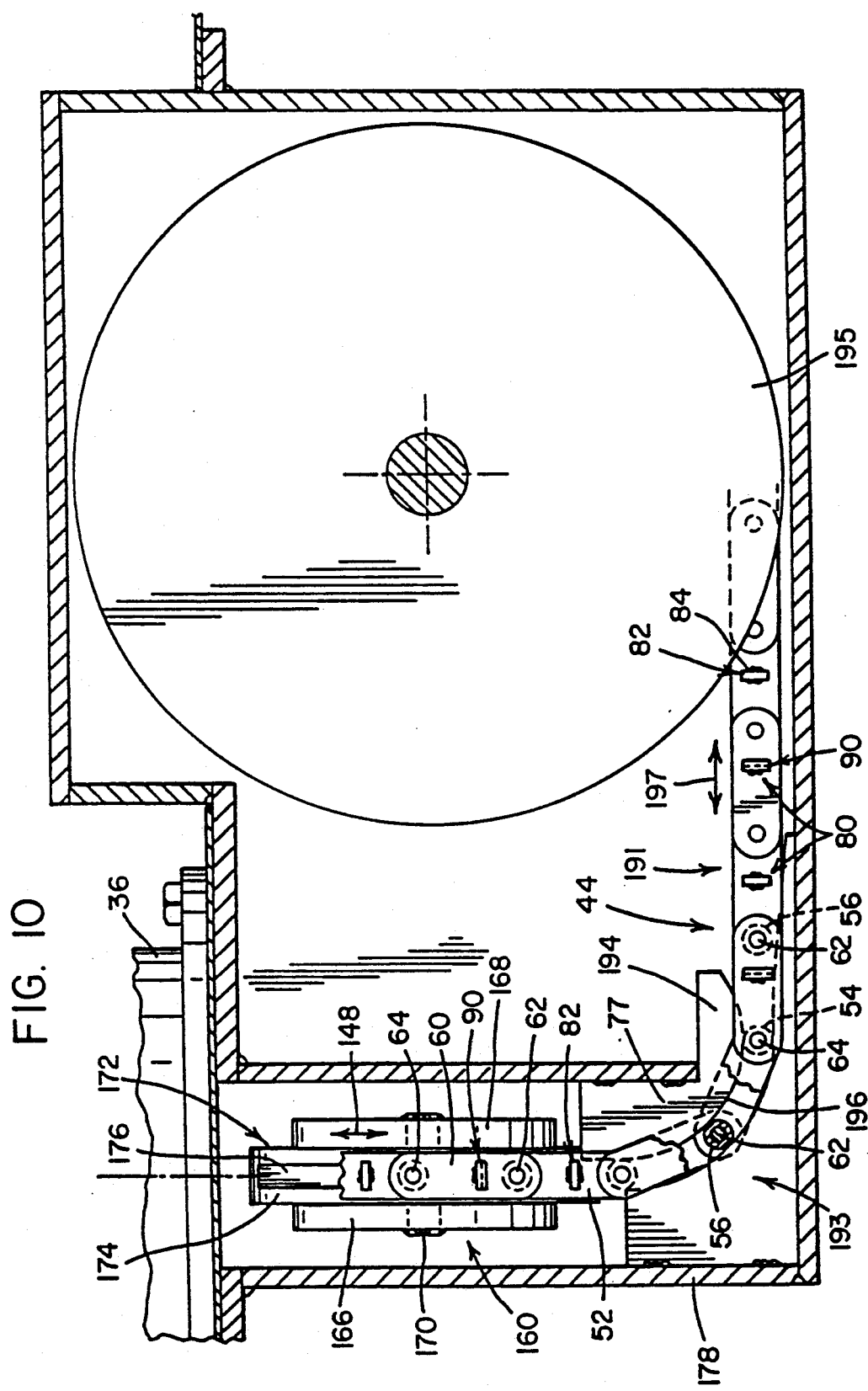
FIG. 10 is a view through section 10—10 of FIG. 9.

Referring to FIGS. 9 and 10, the driven chain 44 has a first driven section 72 passing through the bias means 160 and a second driven section 191 being wound onto a drive chain spool 195. A transition driver section 193 is disposed between the first driven section 172 and the second driven section 191. The transition section 193 includes a transition element 194 having a curvilinear surface 196 which slidably contacts the driven rollers 54 and 56 to enable the driven chain 44 to smoothly move to the longitudinal direction 148 from a transverse direction 197.

Figure 12:
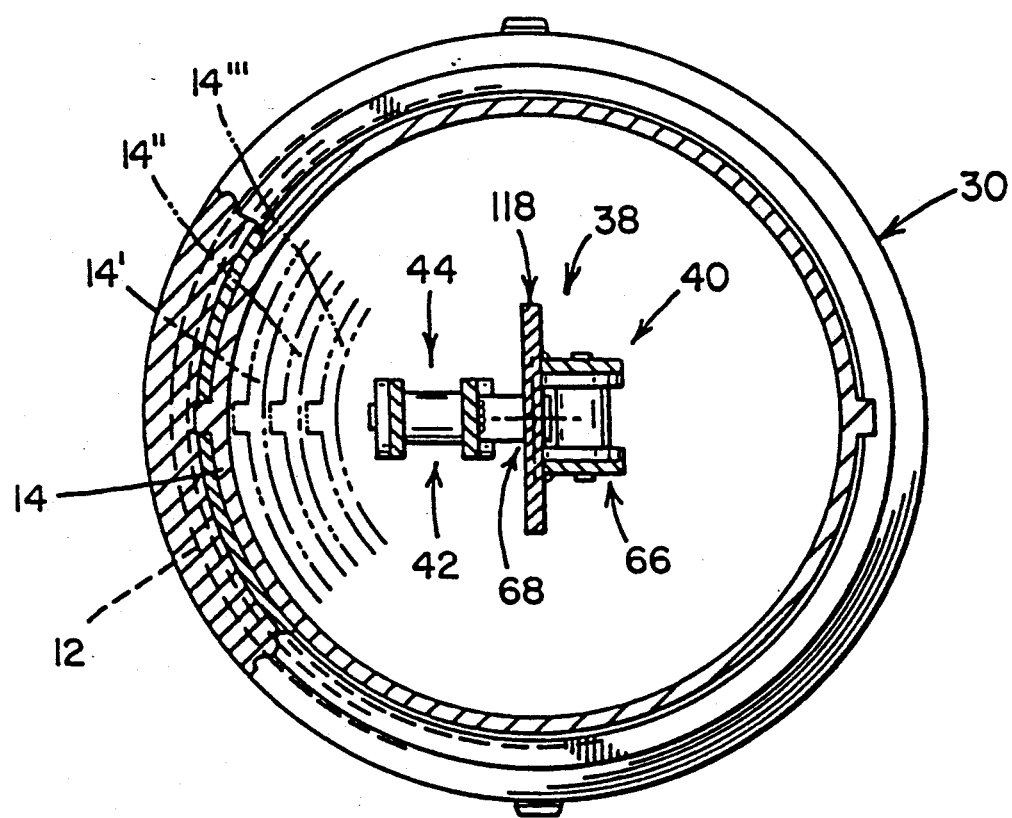
FIG. 12 is a view through 12—12 of FIG. 11.

Referring to FIGS. 2 and 11, the details of the telescoping mast sections are illustrated. The bottom mast section 12, as illustrated in FIG. 11, is received within a collar 198. One end of the mast section 12 can include a neck section 200 having a groove 202 extending thereabout for receiving a set screw 204 for securing the lower half section in place. Note that the collar 198 can be affixed to the support or housing structure 178 by any conventional means such as bolts 206. The lower mast section can protrude from the top of the vehicle 11 and be provided with seal structure 208 and 210 to prevent any moisture from entering the inside of the vehicle 11. Affixed to the upper end of the lower mast section 12 is an inwardly extending flange 30 with a seal 32 to engage the outer peripheral surface of a mast section 14. Thus, as the mast section 14 moves with respect to the flange 30, moisture and other environmental contaminants are prevented from collecting between the lower mast section 12 and the middle mast sections 14. In addition, the flange 30 can also be used as a bearing device with respect to the mast section 14. As illustrated in FIG. 12, the mast sections are nested together.

Internal wiring 310 can be provided within the sections. The wiring can be connected at one end to the equipment 18 on top of the mast and to a power or signal source in any other desired electrical circuitry in the mast support, such as vehicle 11. The wiring 310 can be fed through an aperture in flange 22, not shown. It is, however, within the terms of the present invention to run the wiring 310' external to the mast as shown in FIG. 2.

Figure 13:
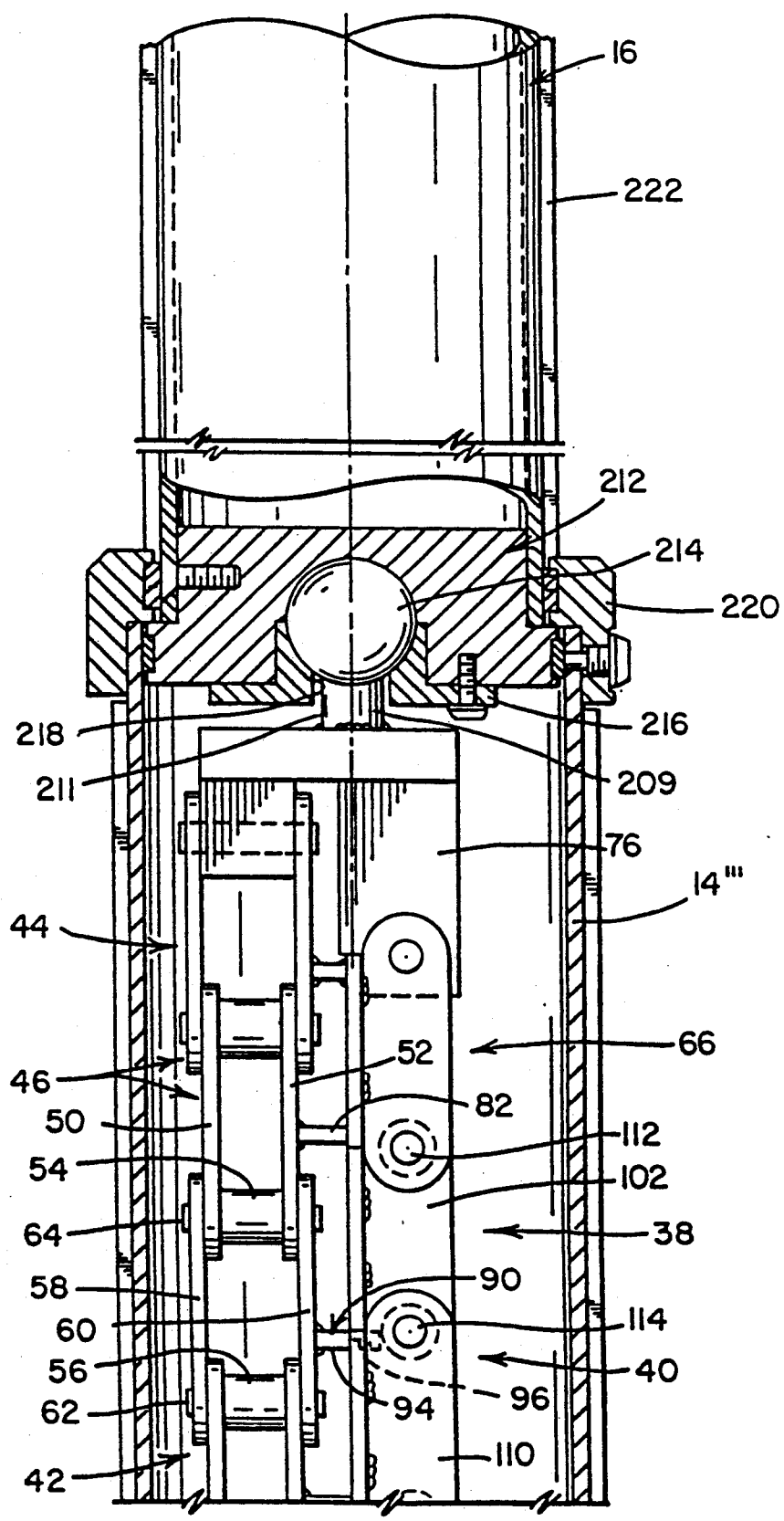
FIG. 13 is a side view illustrating the interconnection between the rigid drive assembly and the innermost mast section.
Figure 17:
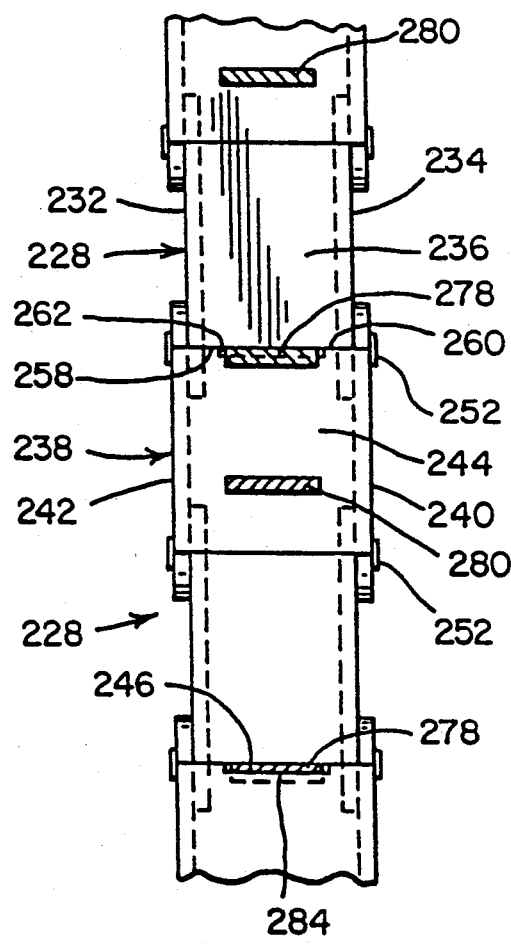
FIG. 17 is a view through 17—17 of FIG. 14.
Figure 18:
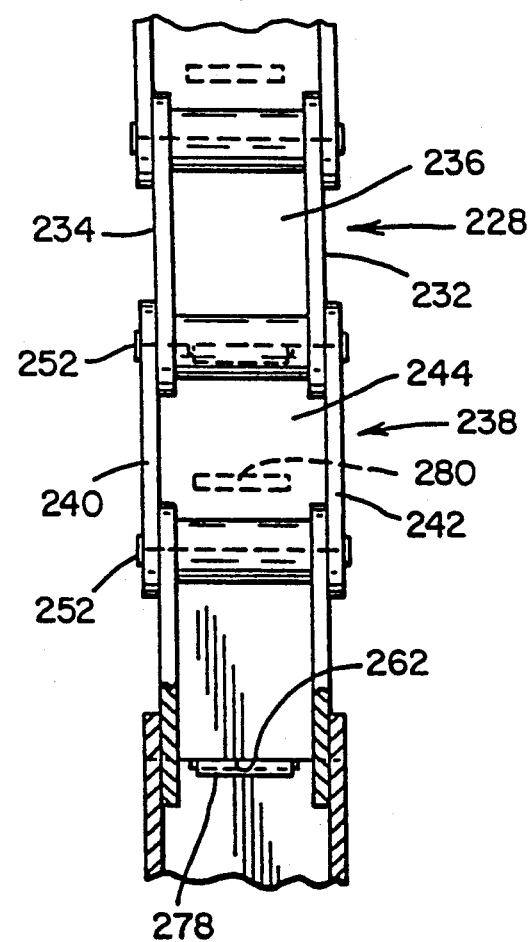
FIG. 18 is a view through 18—18 of FIG. 14.

In operation, the drive sprocket 74 is rotated in a clockwise direction to move the first section of the drive chain 66 in the direction indicated by 148. As illustrated in FIG. 13, one end of the drive chain 66 is connected to a connector link 76. At the same time, an upper end of the driven chain 44 is also connected to the connector link 76. A cylindrical rod 209 having a curved surface 211 is affixed to the top of the connector link 76. The innermost mast section 16 has a plug bottom 212 which is affixed to the bottom of the innermost section 16 by any desired means. A spherical element 214 is fixedly received within the plug and held there by enclosure element 216. The enclosure element includes an aperture 218 extending therethrough having a larger aperture opening than the rod 209 so that the surface 210 of the rod 208 can move and adjust itself and the cylindrical element 214 to accommodate any misalignment between the rigid drive mechanism 38 and the innermost section 16. When the innermost section 16 moves to its most extended position as shown in FIGS. 2 and 13, an interfacing collar 220 received within a keyway 222, formed on the innermost mast section 16, abuts against the plug 212 and prevents further movement of the innermost mast upward with respect to the surrounding mast section 14'''. As the innermost mast section continues to move upward, the mast sections attached to collar 220, i.e. section 14''', continues to move upward. When section 14''' is fully extended, the next outer section, i.e. 14'', begins to extend upward. This sequence of events continues until the mast is fully extended. It can be appreciated that the movement of the rigid drive assembly can be stopped at any time and therefore positioning of the mast assembly can be precisely controlled.

As seen in FIG. 4, each of the mast sections includes at least one aperture 226 through which an observer can view indicia printed on the links of either the drive or driven chain to indicate the height to which the mast has been extended. When the mast sections are in the fully retracted position, an observer can view the indicia on the chains. However, as the mast sections begin to extend upwards, the view can be interrupted. Therefore, it is within the terms of the present invention to incorporate additional holes in the mast sections, if desired, to more precisely determine the height level.

Referring to FIG. 14, there is shown a modification of the first embodiment of the present invention. The drive chain links 228 are constructed, as illustrated in FIG. 16, with the inside link 230 having inside or inner plates 232 and 234 being interconnected by a first plate element 236. If desired, the elements of the inside link can be formed of a single integral piece of material. The outside link 238 includes outside plates 240 and 242 and an outside plate element 244 extending between the two outside plates. The plate element 244 includes a groove 246. The lower inside apertures 248 are connected to the two outer apertures 250 by means of a stud 252. In the same way, the upper inner apertures 254 are connected to the lower outer apertures 256 by means of a stud 252. As in the first embodiment, a bushing and roller are provided on the studs to form a standard roller chain. As with the first embodiment, the end surface 258 of the first plate 236 abuts against the end surface 260 of the plate 244 so that the groove 246 and surface 258 form an aperture 262.

Referring now to the driven chain links 264, two driven inside plates 266 and 268 have bushings and rollers 270 therebetween. Outside driven plates 272 and 274 connect the inside plates and are attached thereto by a pin 276. The outside plate 272 has projecting fingers 278 and 280 extending from either end to cooperate with the drive plates 236 and 244 in the same manner as with the first embodiment. Note that the finger 280 is of a suitable length to abut against the surface 282 of the plate 244. The finger 278 includes a groove 284 to be received within the aperture 262.

The operation of the second embodiment is substantially the same as the first embodiment. That is, as the driven chain links 264 move up or down in the lateral direction 148, the fingers 278 disposed in the apertures 262 simultaneously effect the movement of the driven chain links 264.

A third modification is shown in FIGS. 19 and 20. The driven chain links 290 include first and second inside driven plates 292 and 294 and first and second outside driven plates 296 and 298. The inside and outside driven plates are connected together by pins and rollers as in the previous embodiments. Each of the inside and outside driven plates 294 and 298 which are adjacent to the drive chain links 300 include a driven finger 302 and 304 which can be punched out of the plates. These fingers 302 and 304 are sized to either abut against or be received within the aperture in the drive chain 300 which is substantially the same as the drive chain 224 described in the second embodiment or the drive chain 66 described with regards to the first embodiment.

Both the drive chain 66 and the driven chain 44 can be constructed of materials selected from the group comprising ferrous, non-ferrous, metallic and non-metallic materials.

Although the drive chain has been disclosed with an aperture extending therein to receive a finger from the driven chain, it is also within the scope of the present invention to reverse the chains so that the drive chain includes the projecting fingers and the driven chain includes the apertures to receive the projecting fingers.

Although the drive and driven chains are disclosed as being wound onto chain spools, it is within the terms of the present invention to let the chains extend freely in any direction. Moreover, they can be run through a serpentine track or simply increased in length, as desired, by an operator.

The invention has been described with reference to a preferred embodiment and it is apparent that many modifications may be incorporated into the design and configuration of the telescoping mast assembly discussed herein without departing from the spirit or the essence of the invention. It is my intention to include all such modifications and alterations insofar as they come within the scope of my invention. It is thus the essence of my invention to provide a telescoping mast assembly which can be readily adapted and configured to be incorporated in a wide variety of applications.

Having thus defined the invention, the following is claimed:

1. A chain assembly, comprising:
a plurality of drive links, each of said drive links, including:
a plurality of spaced inner drive links each having two substantially parallel inner drive plates separated by two drive rollers;
a plurality of outer drive links each having two parallel outer drive plates connecting adjacent inner drive links;
first plate elements affixed to the inner drive plates;
second plate elements affixed to the outer drive plates;
a plurality of driven links, each of said driven links including:
spaced inner driven links constructed of two substantially parallel inner driven plates separated by two driven rollers;
outer driven links constructed of two parallel outer driven plates connecting adjacent inner driven links;
first projecting elements affixed to the driven plates;
second projecting elements affixed to the driven plates; and
latching means connecting said drive links to said driven links whereby said drive links are rigidly affixed to said driven links, said latching means comprising said first and second projecting elements and said first and second plate elements.

2. The chain assembly of claim 1 wherein:
said first projecting elements are affixed to the inner driven plates; and,
said second projecting elements are affixed to the outer driven plates.

3. The chain assembly of claim 2 wherein:
said first projecting elements are an integral section of said inner driven plates and are punched out of said inner driven plates; and,
said second projecting elements are an integral section of said outer driven plates and are punched out of said outer driven plates.

4. The chain assembly of claim 1 wherein:

said first plate elements are each constructed of a substantially rectangular first plate having a substantially flat, upper edge surface with a plate slot formed therein and an opposing substantially flat lower edge surface;

said second plate elements are constructed of a substantially rectangular second plate element having substantially flat upper and lower edge surfaces; and, said first and second plate elements being alternately disposed between each other whereby the substantially flat upper edge surface of the second plate element abuts the substantially flat lower edge surface of the first plate element and the substantially flat upper edge surface of the first plate element abuts the substantially flat lower edge surface of the second plate element for said plate slot and substantially flat lower edge to provide a plate aperture therebetween.

5. The chain assembly of claim 4 wherein:

said first projecting elements have a substantially flat, first end with a rectangular cross-section;

said second projecting elements having a substantially rectangular cross-section with a substantially flat, upper surface and a substantially flat lower surface, said flat lower surface having a projecting element slot formed therein; and, said first and second projecting elements being affixed to alternate, adjacent driven links whereby the substantially flat end of the first projecting elements abut against the first plate elements to maintain the distance between the drive and driven links and the second projecting elements are received within the plate apertures with the projecting element slot being disposed to receive the plate slot formed in the upper edge surface of the first plate.

6. The chain assembly of claim 1 wherein said drive links and said driven links are constructed of a material selected from the group comprising ferrous, non-ferrous, metallic and non-metallic materials.

7. A chain assembly comprising first and second link chains each having opposite ends and each comprising alternating pairs of parallel inner link plates and parallel outer link plates having overlapping ends in the direction between said opposite ends, said overlapping ends being pivotally interconnected by roller means laterally therebetween, said roller means providing each said first and second link chains with corresponding roller axes, said first and second link chains being disposed adjacent one another with the roller axes of said first link chain perpendicular to the roller axes of said second link chain, and means on said first link chain interengaging with means on said second link chain to preclude pivotal displacement of adjacent inner and outer link plates of said first and second link chains about said corresponding roller axes.

8. A chain assembly according to claim 7, wherein said means on said first link chain includes means providing said first link chain with a plurality of latching slots spaced apart in the direction between the opposite ends of said first link chain, and said means on said second link chain includes latching finger means received in said slots.

9. A chain assembly according to claim 8, wherein said means providing said first link chain with a plurality of latching slots includes first plate means between and fixed to said pairs of inner link plates of said first chain, and second plate means between and fixed to said pairs of outer link plates of said first chain, each said first and second plate means having laterally extending opposite end edges, the adjacent end edges of adjacent first and second plate means abutting one another when said roller axes of said first link chain means are coplanar, and the end edges of alternate ones of said adjacent end edges including said slots opening through the corresponding first and second plate means between the adjacent end edges thereof.

10. A chain assembly according to claim 9, wherein said first and second plate means are planar plate members mounted on said inner and outer link plates of said first link chain.

11. A chain assembly according to claim 9, wherein said first and second plate means are planar and formed integrally with said inner and outer link plates, respectively, of said first link chain.

12. A chain assembly according to claim 9, wherein one of said end edges of alternate ones of said adjacent end edges is a linear end edge on one of said corresponding first and second plate means, and the other of said end edges is on the other of said corresponding first and second plate means and includes linear end edge portions abutting said linear end edge, and a recess between said linear edge portions and opening toward said linear end edge, said recess and the opposed portion of said linear end edge providing the corresponding slot.

13. A chain assembly according to claim 8, wherein said means on said second link chain further includes stabilizing finger means engaging against said first link chain between said latching slots.

14. A chain assembly according to claim 13, wherein said latching finger means and said stabilizing finger means are attached to and spaced apart along said second link chain in the direction between said opposite ends thereof and extend from said second link chain parallel to the roller axes thereof.

15. A chain assembly according to claim 14, wherein said latching finger means extend laterally outwardly from the outer link plates along one side of said second link chain and said stabilizing finger means extend laterally outwardly from the inner link plates along said one side.

16. A chain assembly according to claim 15, wherein said latching and stabilizing finger means are respectively struck from and integral with said outer and inner link plates along said one side of said second link chain.

17. A chain assembly according to claim 14, wherein said outer link plates of said second link chain have opposite ends in said direction, said latching finger means being integral with said outer link plates at one of said opposite ends thereof and said stabilizing finger means being integral with the other of said opposite ends thereof.

* * * * *